(12) United States Patent
Kronz et al.

(10) Patent No.: US 11,948,450 B2
(45) Date of Patent: *Apr. 2, 2024

(54) SYSTEMS AND METHODS FOR DYNAMIC BUILDING EVACUATION

(71) Applicants: Jason Kronz, Suwanee, GA (US); Christopher Dispain, Suwanee, GA (US)

(72) Inventors: Jason Kronz, Suwanee, GA (US); Christopher Dispain, Suwanee, GA (US)

(73) Assignee: Buildingreports.com, Inc., Suwanee, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/988,519

(22) Filed: Nov. 16, 2022

(65) Prior Publication Data

US 2023/0074176 A1     Mar. 9, 2023

Related U.S. Application Data

(63) Continuation of application No. 17/013,629, filed on Sep. 6, 2020, now Pat. No. 11,508,223, which is a
(Continued)

(51) Int. Cl.
*G08B 17/06* (2006.01)
*G08B 7/06* (2006.01)
(Continued)

(52) U.S. Cl.
CPC ............. *G08B 7/066* (2013.01); *G08B 7/062* (2013.01); *G08B 17/10* (2013.01); *G08B 17/103* (2013.01); *G08B 21/12* (2013.01); *H04W 4/38* (2018.02)

(58) Field of Classification Search
CPC ...... G08B 17/10; G08B 17/103; G08B 21/12; G08B 25/12; G08B 7/062; G08B 7/066; G08B 5/36; G08B 21/10; G08B 25/006; G08B 25/014; G08B 25/016; G08B 25/10; G08B 27/006; G08B 27/008; G08B 29/145; G08B 25/08; G08B 17/00; G08B 5/222; G08B 25/00; G08B 25/001; G08B 25/007; G08B 25/009; G08B 25/085; G08B 7/06; G08B 17/113; G08B 21/22; G08B 17/107; G08B 17/11; G08B 19/00; G08B 29/126; G08B 29/181; G08B 29/183; H04W 4/38; H04W 64/006; H04W 4/80; G01C 21/206; G01M 99/00; G06F 21/552; H04L 41/0609; H04L 41/0873; H04L 41/16; H04L 43/0817; H04L 43/12; H04L 43/16;
(Continued)

(56) References Cited

U.S. PATENT DOCUMENTS 4,301,674 A    11/1981   Haines et al.
5,565,852 A    10/1996   Peltier et al.
(Continued)

*Primary Examiner* — Dionne Pendleton
(74) *Attorney, Agent, or Firm* — Hill, Kertscher & Wharton, LLP; Gregory T. Ourada

(57) ABSTRACT

A disclosure and claims to systems and methods for allowing rapid detection and display of an emergency condition using a plurality of specially-constructed multifunction sensors and display units, which allow building evacuation plans to be evaluated, modified, and transmitted to building occupants.

7 Claims, 8 Drawing Sheets

Related U.S. Application Data continuation of application No. 16/002,713, filed on Jun. 7, 2018, now Pat. No. 10,769,902.

(51) Int. Cl.
  *G08B 17/10*     (2006.01)
  *G08B 17/103*    (2006.01)
  *G08B 21/12*     (2006.01)
  *H04W 4/38*      (2018.01)

(58) Field of Classification Search
  CPC ....... H04L 63/1425; H04L 67/02; A62B 3/00; A62C 35/68; G09F 2019/225; A61B 5/1115; A61B 90/90; A61G 12/00; A61G 2203/12; A61G 2203/70; G16H 40/20
  See application file for complete search history.

(56) References Cited

U.S. PATENT DOCUMENTS

| | | | |
|---|---|---|---|
| 5,838,223 A | 11/1998 | Gallant et al. | |
| 11,508,223 B2 * | 11/2022 | Kronz | G08B 7/062 |
| 2013/0053063 A1 | 2/2013 | McSheffrey | |
| 2014/0320282 A1 | 10/2014 | Zhang | |
| 2015/0137967 A1 | 5/2015 | Wedig et al. | |
| 2016/0180663 A1 * | 6/2016 | McMahan | G08B 7/062 340/691.6 |

* cited by examiner

14

42 40 41

SYSTEMS AND METHODS FOR DYNAMIC BUILDING EVACUATION

FIELD OF THE INVENTION

The embodiments described herein relate to the field of building safety systems and methods, in particular, building evacuation systems and methods.

BACKGROUND OF THE INVENTION

Currently, building fire detection systems allow building managers to detect an emergency condition using installed smoke alarms and pull stations which allow both manual and automatic detection of a fire condition. Once a fire or emergency condition is detected, fire alarms or other alerts signal building occupants to either evacuate or shelter in place. However, current building evacuation systems have static evacuation plans that cannot be changed to reflect the realities of an emergency situation. These plans usually involve the building occupants proceeding directly to the nearest building exit, or in multi-story buildings, stairwells leading to the nearest building exit. One major problem with this is that a fire can in theory occur anywhere, including on an evacuation route. In this case, a prerehearsed evacuation route can actually put evacuees in greater danger. Another issue is that the location of building occupants may not be accurately known. Yet another issue is that the precise location and nature of an emergency condition may not be immediately known. For example, fire alarms can be activated manually, and the location of the fire alarm, i.e. pull station that was activated gives an indication that the emergency condition is occurring in the vicinity of that particular alarm, but does not localize the source with any accuracy, nor does it indicate the exact nature of the emergency condition. Similarly, detectors that automatically alert in the presence of smoke are strong indicators that a fire is present, but do not permit the location of the fire to be determined precisely, since smoke can travel for some distance in a building before being detected.

BRIEF SUMMARY OF THE INVENTION

Embodiments disclosed describe systems and methods of detecting the nature and location of an emergency condition rapidly using a distributed network of sensor and signal units and pull stations that are in communication with local control units and remote control stations. The local control units and remote control stations are comprised in part of computational resources which analyze existing evacuation plans and, if necessary, provide the capability of changing such evacuation plans in real time. The sensor and signal units and pull stations enhance the capabilities of conventionally-installed smoke alarms and pull stations to include not only sensors, but multifunction displays or signals so that customized evacuation routes can be quickly communicated to evacuees.

The sensor and signal units feature a signal or display apparatus and at least a smoke detector that may be recessed into the ceiling to enhance smoke detection. The signal or display apparatus features either an array of LED lights or a multifunction display that are bright enough to be viewed in low visibility (e.g. smoky) conditions. For example, one embodiment of the system consists of a distributed network of temperature, humidity, motion, smoke, and sound detectors embedded in fire pull stations and sensor and signal units located on wall and ceilings, respectively. These distributed sensors detect indications across a wide spectrum (e.g. infrared, moisture, particulate matter, and pressure wave) and transmit anomalous data to a data processing station located within a building. The local control unit located within a building is networked with a remote control station that is typically collocated with a municipal fire authority. Either the local control unit or remote control station are capable of autonomously processing the sensor network data and evaluating the predefined building evacuation route to determine whether the source of the emergency is located in the path of an evacuation route. If it is, an alternate route can be automatically generated to avoid the emergency source. This alternate route is transmitted to the sensor and signal units and pull station, which display either text, symbols, or patterns directing evacuees along the appropriate evacuation route. An alternate building evacuation route can also be generated manually by a building fire marshal, municipal fire chief, police on-scene commander, or other authority having jurisdiction on the scene from either the local or remote data processing stations, or from a personal computing device such as a smartphone or tablet device having application software that interfaces via wireless network with the local and remote data processing stations.

DETAILED DESCRIPTION OF THE INVENTION

The invention is described in preferred embodiments in the following description with reference to the Figures, in which like numbers represent the same or similar elements. Reference throughout this specification to "one embodiment", "an embodiment", or similar language means that particular feature, structure, or characteristic described in connection with the embodiment is included in at least one embodiment of the present invention. Thus, appearances of the phrases "in one embodiment", "in an embodiment", "in certain embodiments", and similar language throughout this specification may, but do not necessarily, all refer to the same embodiment. It should be noted that, as used in this description, the singular forms "a", "an", and "the" include plural referents unless the context clearly dictates otherwise.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
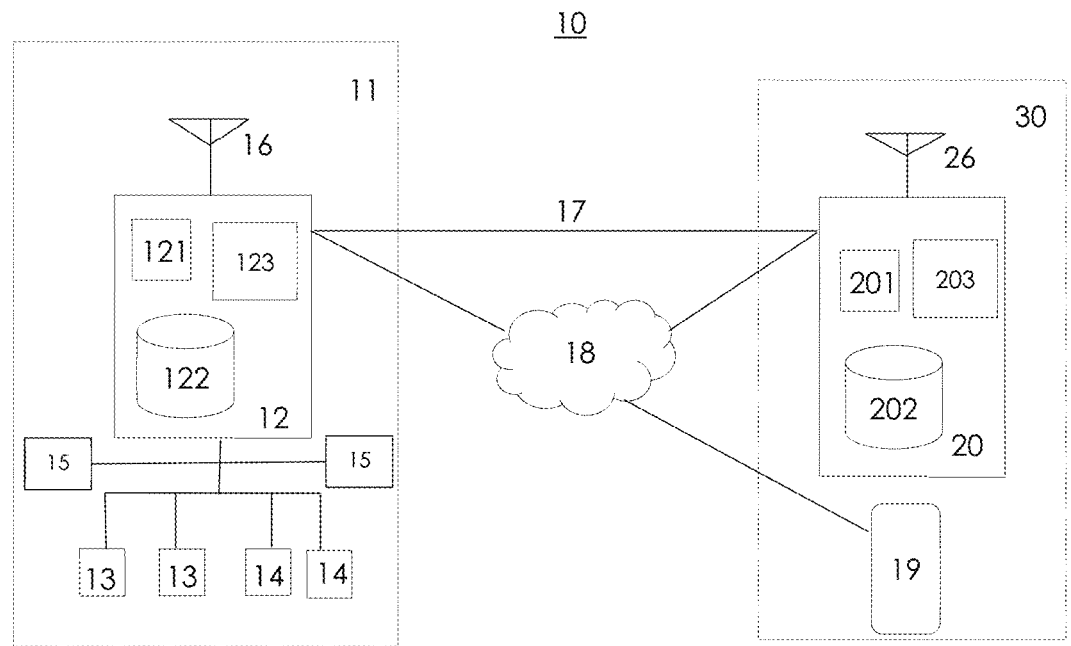
FIG. 1 shows a functional block diagram of one contemplated embodiment of a building dynamic evacuation system.

A block diagram of an embodiment of a building dynamic evacuation system 10 is presented in FIG. 1. Local control unit 12 is located within a building 11 and is connected either via hardwired connections or via a wireless connection to a plurality of pull stations 13, sensor and signal units (SSU) 14, both of which will be described in greater detail herein, and legacy (currently known to the prior art, e.g. smoke or moisture detectors and pull stations without the features described herein) sensors 15 located throughout the building. Local control unit includes a general purpose computer 121, a database 122, and a transceiver 16. Remote control station 20 includes a general purpose computer 201, database 202, transceiver 26, all of which are located at a remote location 30, which could be the office of a municipal fire marshal or other authority having jurisdiction (AHJ). Alternatively, remote control station 20 can be embodied by a portable computing device 19, e.g. a smartphone, tablet computer, or laptop. Local control unit 12 can be connected to remote control station 20 via hardwired connection 17, cellular or RF connection via transceivers 16, 26, or via computer network 18. Portable computing device 19 is connected wirelessly via computer network 18, via standard wireless communications protocols.

Local control unit 12 is comprised of a general purpose computer 121 capable of executing a software program consisting of instructions stored in in internal memory and operating on data stored in database 122. Local control unit also includes an input/output terminal 123 coupled to general purpose computer and database 122. This data includes information on building floor plans, safety equipment, evacuation routes, and other safety data. The software program further manages data exchange between local control unit 12 and remote control station 20, including data from pull stations 13 and SSU 14, and instructions including modified evacuation plans received from remote control station 20 and from personal computing device 19. Computer 121 receives data from sensors located within pull stations 13 and SSUs 14. Computer 121 is also capable of receiving signals from legacy sensors 15. This data is analyzed using software algorithms to rapidly determine both the nature and location of the emergency, as well as the location of persons within the areas of the building impacted by the emergency event. The location of persons within the building may be determined by signals transmitted from motion, pressure/sound, or IR/temperature sensors integrated into the pull stations 13 and the SSU 14. The next step performed using software algorithms is to compare the location of the emergency event with the location of the building's occupants relative to pre-existing evacuation plans stored in database 122. If these pre-existing evacuation plans allow the occupants to exit the building safely, then local control unit will, depending on how the software is configured, either issue evacuation instructions automatically or upon manual command.

Figure 2:
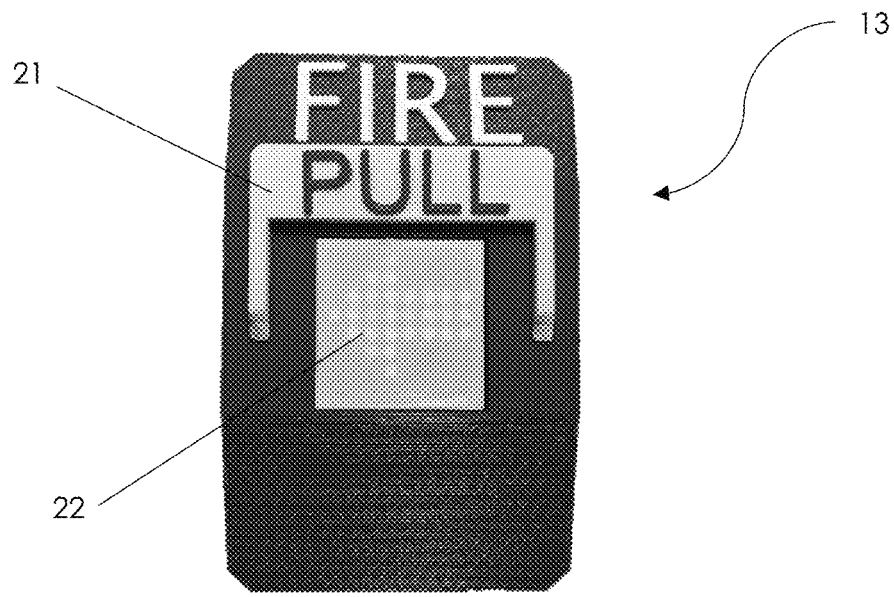
FIG. 2 shows one embodiment of a wall-mounted fire pull station.

FIG. 2 illustrates one embodiment of pull station 13. It permits manual initiation of an alarm condition using a manual activation lever 21. Pull station 13 also incorporates a multifunction display 22 that may display indicia or messages relevant to emergency building evacuation, e.g. an arrow showing the route to an exit. These indicia or messages are generated by local control unit 12, in response to stored, pre-planned evacuation instructions, or in response to a manually-generated evacuation plan from a municipal fire marshal or authority having jurisdiction operating from a remote control station 20. Pull stations 13 also integrate a variety of sensors, depending on the embodiment, including smoke, temperature, sound, motion, and humidity/moisture.

Figure 3:
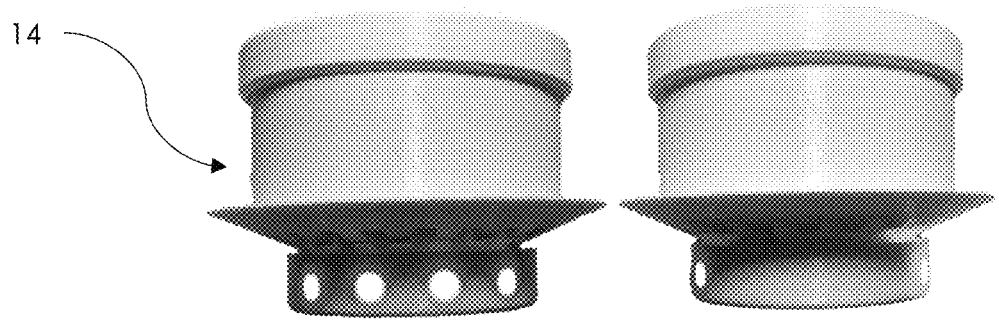
FIG. 3 illustrates one embodiment of a sensor and signal unit (SSU).
Figure 4:
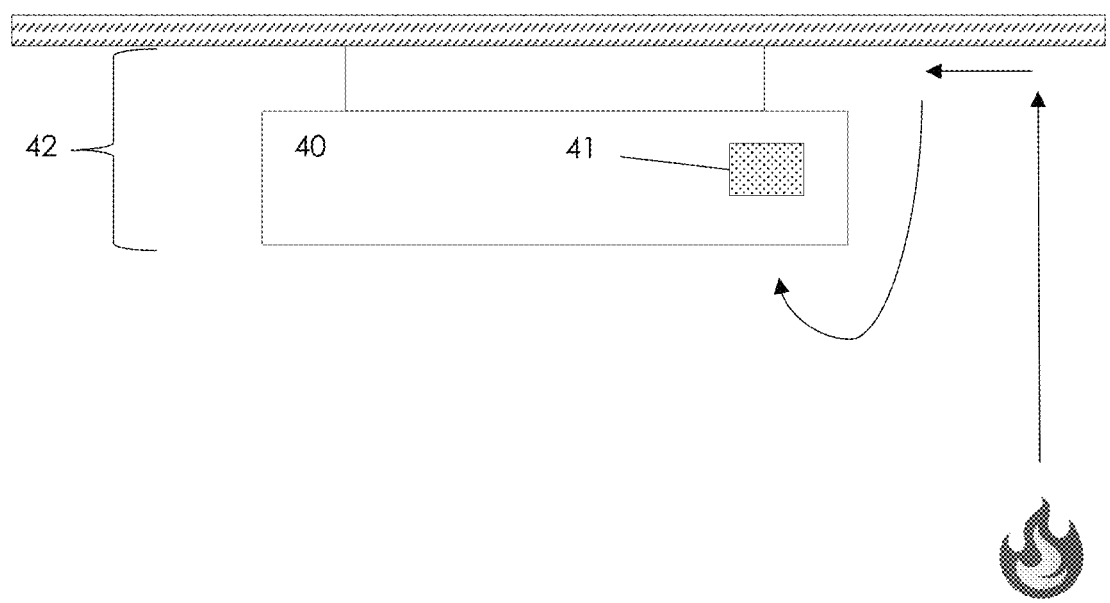
FIG. 4 illustrates smoke flow to a conventional smoke detector ceiling installation.

Local control unit 12 is also connected to a plurality of sensor and signal units (SSU) 14 located throughout the building. FIG. 3 shows front and side views of SSU 14 in one preferred embodiment. SSU 14 are designed both to detect an emergency condition, as well as facilitate dynamic building evacuation plans. Depending in the embodiment, they incorporate the same suite of detection sensors as pull stations 13, e.g. smoke, temperature, sound, motion, and humidity/moisture. One particular embodiment features a smoke sensor cavity that is recessed into the ceiling in order to enhance its smoke detection capability. FIG. 4 illustrates how with a conventionally-mounted smoke detector 40, the flow of smoke from a fire rises vertically to the ceiling, travels horizontally along the ceiling, and then has to travel downward and then upward again into detector 41 before being detected. Furthermore, until the smoke layer on the ceiling is greater than the thickness 42, smoke may not enter the detector at all, unless the smoke is being generated directly underneath the detector, i.e. the fire is directly below the detector. This results in an unacceptable delay in an alarm signal being generated.

Figure 5:
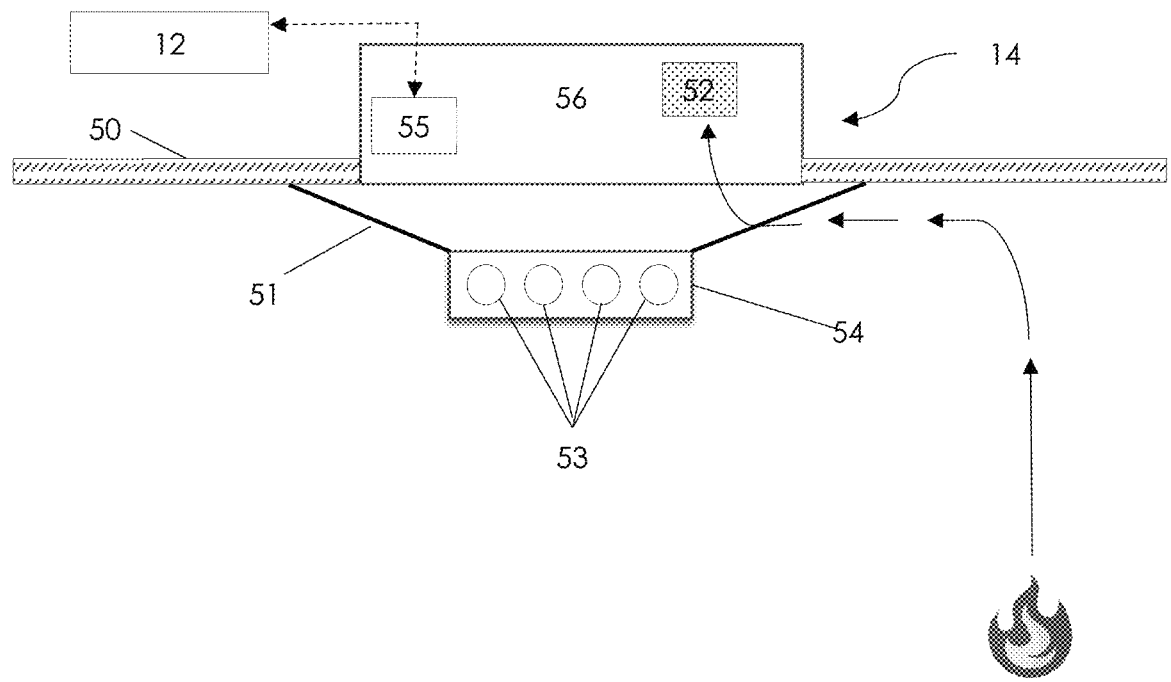
FIG. 5 illustrates smoke flow to one embodiment of a sensor and signal unit (SSU) featuring an array of individual LED signal lights.

FIG. 5 illustrates SSU 14 featuring a smoke sensor cavity 56 that is recessed into ceiling 50 in which smoke sensor 52 is located, so that the smoke sensor is above the plane of the ceiling. SSU 14 also features a vent section 51 containing multiple vents leading into smoke detector cavity 56. FIG. 5 shows that during a fire, smoke rises vertically from the fire source, travels horizontally along the ceiling passing freely through vent section 51, and then rises upward into the vicinity smoke sensor 52 in smoke sensor cavity 56, thereby triggering an alarm. Unlike the conventional smoke detectors mounted as shown in FIG. 4, there is no delay caused by the smoke layer building up on the ceiling.

Figure 5A:
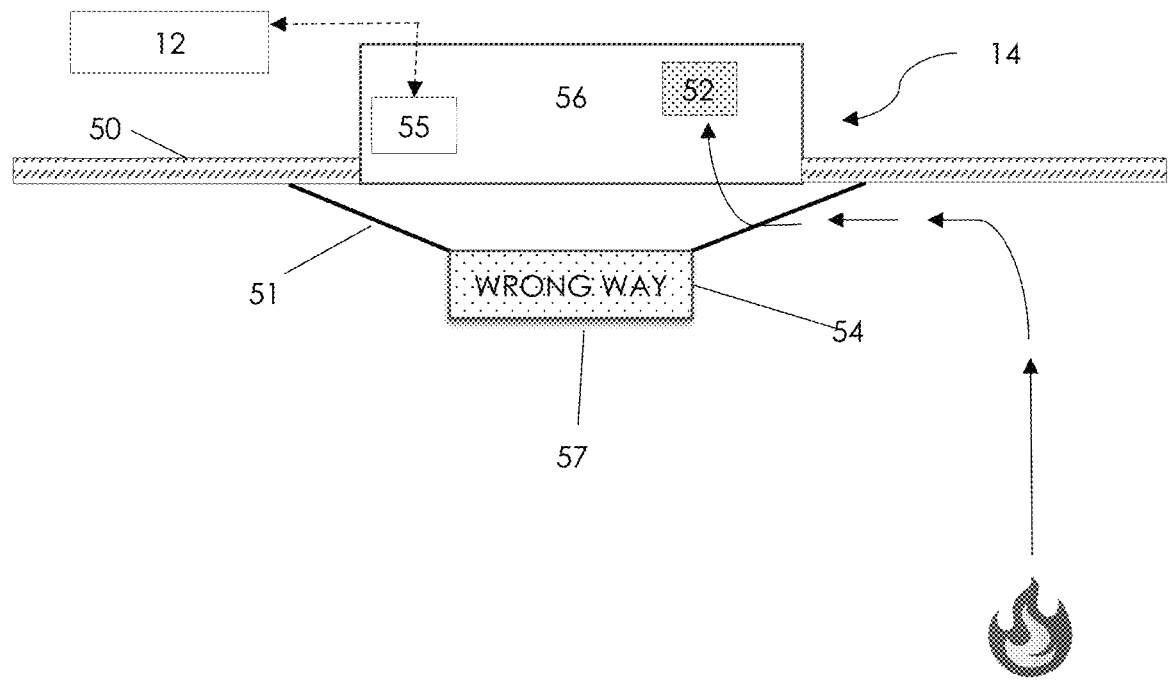
FIG. 5A illustrates smoke flow to one embodiment of a sensor and signal unit featuring a multifunction display.
Figure 6:
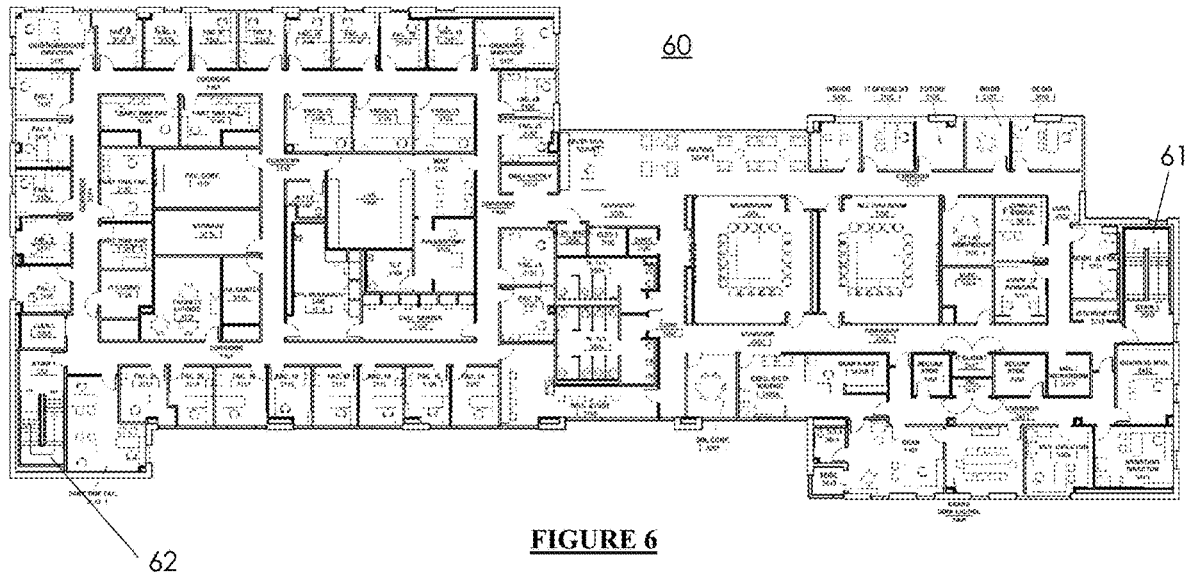
FIG. 6 is an exemplary building floor plan that could be displayed at either the local control unit or remote control station illustrating building fire stairwells.

SSU 14 also features a plurality of high-intensity signal lights 53, such as multi-color LEDs mounted on a signal housing 54. In one preferred embodiment, signal housing 54 is cylindrical so that signal lights 53 are disposed in a 360-degree arc. Signal lights 53 illuminate in specific colors and patterns, each corresponding to a different evacuation plan, depending upon the evacuation signal generated at local control unit 12 or remote control station 20. These evacuation signals are transmitted to a microcontroller 55 located in SSU 14. A microcontroller 55 translates the evacuation signals into a specific light pattern corresponding to the particular evacuation order. The color of the lights are dictated by the nature of the alarm and the signal provided by the control units 12, 20, as will be described in greater detail below. FIG. 5A shows an alternate embodiment of SSU 14 featuring one or more multifunction displays 57 mounted within signal housing 54 such that the displays are visible from all relevant directions.

Depending on the embodiment, pull station 13 may also contain temperature, humidity, motion, smoke, and sound detectors. Temperature and smoke detectors directly indicate the presence of fire; humidity sensors detect flooding or the activation of a sprinkler system and so could provide indirect indications of a fire condition within a structure. Motion and sound detectors are useful for detecting which portions of the interior of a building are occupied. Motion and sound sensors are also used for detecting signs of criminal or other abnormal activity within the building. Such activity could be indicated by the presence of abnormally loud noises within the structure, e.g. shouting, screams, or gunshots, or running Being able to quickly locate both the emergency event, as well as all inhabitants in the area affected by such event is a paramount factor in developing and executing a dynamic evacuation plan.

Remote control station 20 is located at a different physical location 30 than building 11. For example, remote control station 20 could be associated with a municipal fire marshal or other authority having jurisdiction (AHJ) over building occupational safety. Remote control station 20 comprises a computer 201, a database 202 containing data similar to that contained in database 122, i.e. information regarding building floor plans, installed safety equipment, evacuation routes, and other occupational safety data. Unlike database 122, the remote control station's database 202 would contain data for a plurality of buildings over which the fire marshal or AHJ has jurisdiction. Both computer 201 and database 202 are coupled to an input/output terminal 203 allowing the AHJ/fire marshal to view building floor plans in an emergency. Local control unit 12 and remote control station 20 can be connected in a variety of ways, e.g. through hardwired connections 17, wireless via transceiver 16, via Internet 18, or combinations thereof. In certain embodiments, remote control station 20 could consist of a personal computing device 19 such as a tablet computer, laptop, or smartphone executing software instructions located in the device's internal memory. This software allows varying degrees of access depending on the nature of the user. One access level granted only to fire marshals/AHJs allow the user to send commands to computers 121, 201 that modify the building evacuation route and access certain categories of restricted building data, etc. Another access level can be granted to users who are occupants of a particular building, but who are otherwise not building safety authorities. This access level allows the user to see building floor plans and evacuation routes, but these users cannot send commands to computers 121, 201 changing evacuation routes. The software is designed to direct these users to the appropriate evacuation route.

Figure 7:
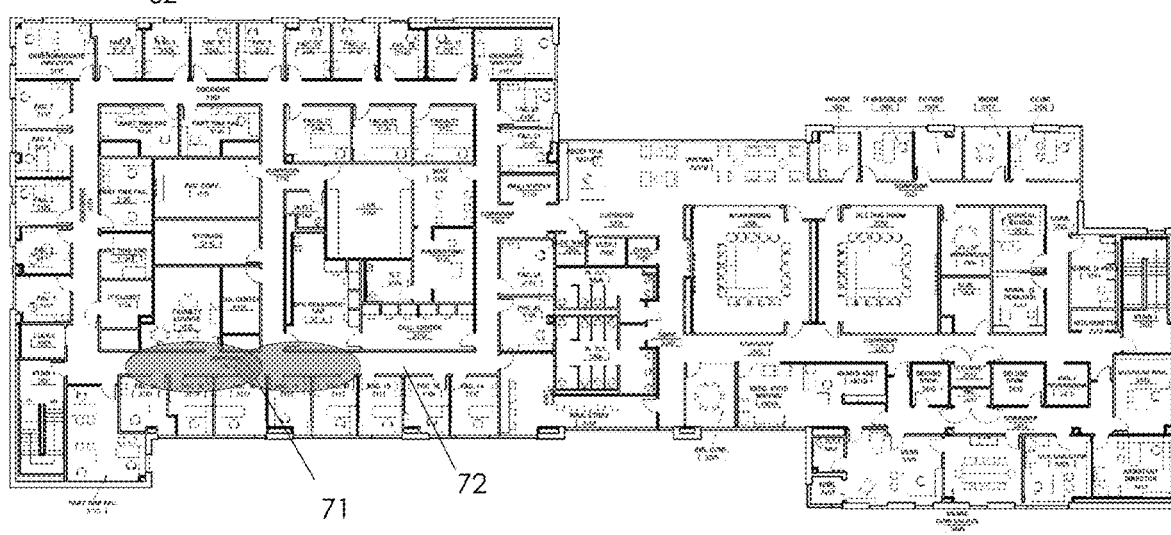
FIG. 7 illustrates a detected fire condition superimposed on an exemplary building floor plan that could be displayed at either the local control unit or remote control station
Figure 8:
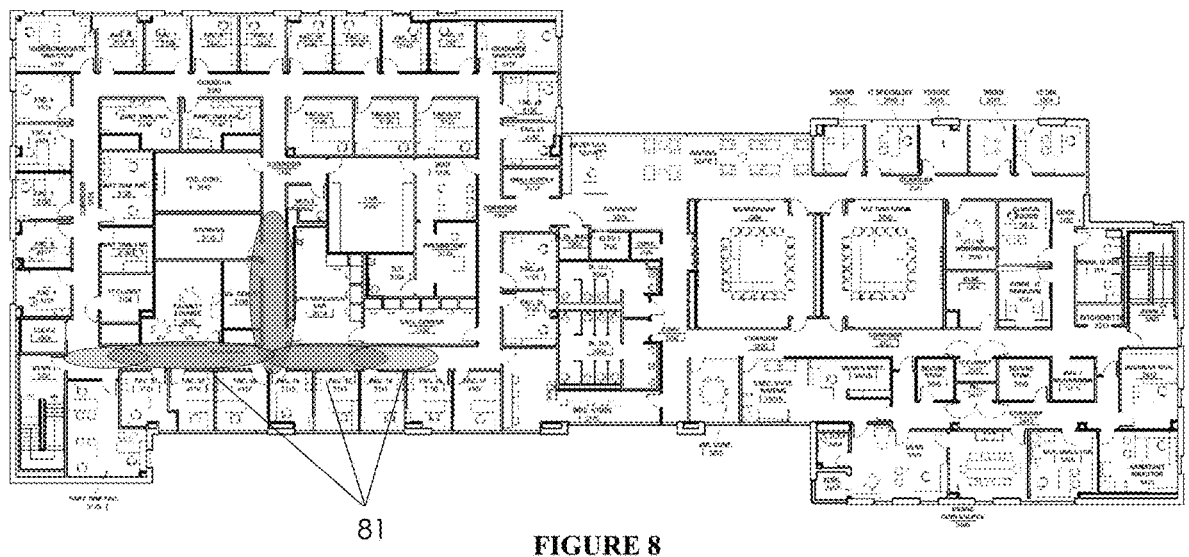
FIG. 8 illustrates the progression of detected heat and smoke during a fire condition superimposed on an exemplary building floor plan that could be displayed at either the local control unit or remote control station.
Figure 9:
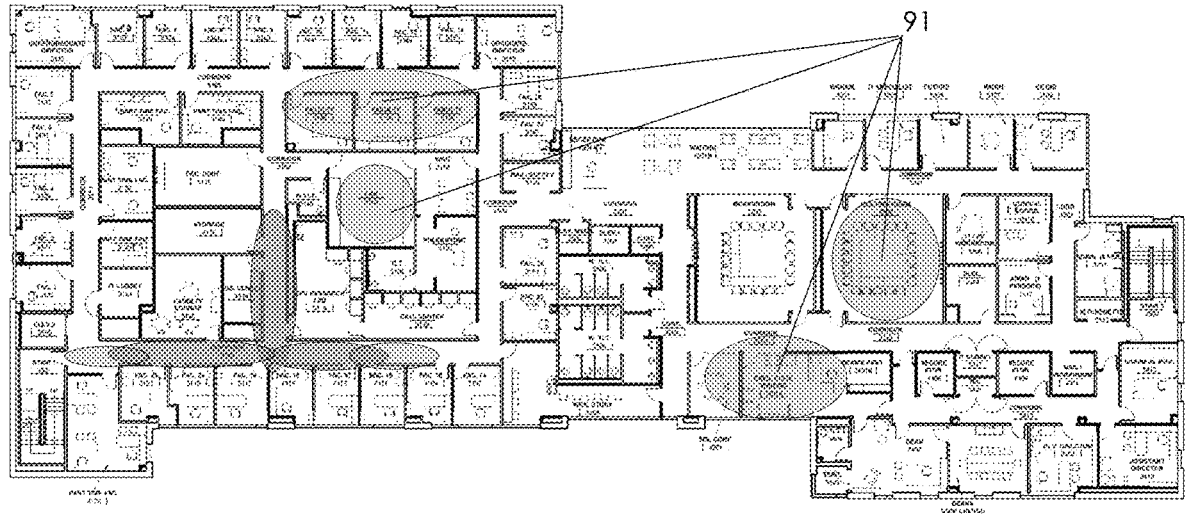
FIG. 9 illustrates motion detections superimposed on an exemplary building floor plan that could be displayed at either the local control unit or remote control station show the locations of building occupants that must be evacuated.

FIGS. 6 through 11 illustrate the operation of the system embodiments described above, with reference to a hypothetical floor plan 60, showing building evacuation stairwells 61, 62. These figures are examples of what users at the local control unit 12 and fire marshals/AHJs at remote control station 20 would see displayed on terminals 123, 203, or on personal computing device 19 during an emergency condition. In FIG. 7, temperature and humidity changes in region 71 are detected by temperature and humidity sensors located in pull station(s) 13, and smoke may be detected by pull stations or SSUs located in corridor 72. FIG. 8 shows the temperature and humidity changes 81 propagating down corridor 72. These changes are detected by pull stations 13 and SSUs 14 located in the corridor. The temperature, humidity, and smoke detection from pull stations 13 and SSUs 14 is transmitted via hardwired or wireless connections to local control unit 12. Software algorithms running on general purpose computer 121 automatically analyze the received sensor data in relation to parameters stored in database 122 to determine if the threshold conditions for an evacuation are met. If so, fire alarms are activated, and software running on general purpose computer 121 calls the evacuation plan subroutine.

Figure 10:
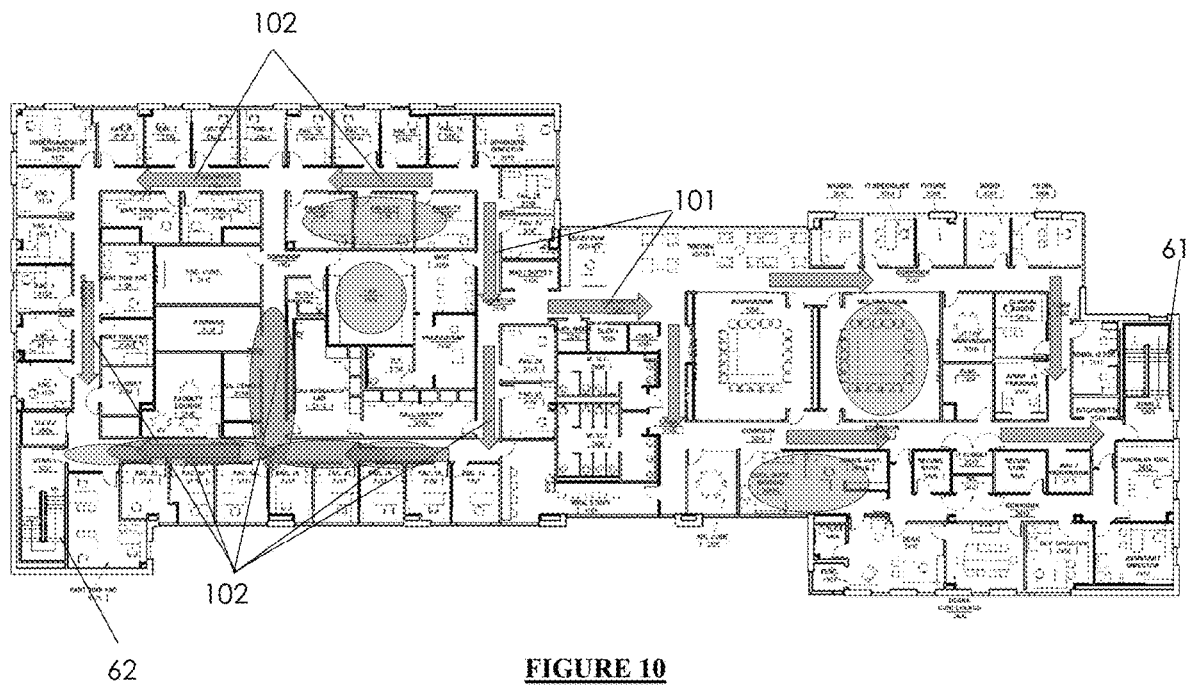
FIG. 10 illustrates how default evacuation routes are displayed on an exemplary building floor plan that could be displayed at either the local control unit or remote control station, and how these routes may lead evacuees into the emergency condition.
Figure 11:
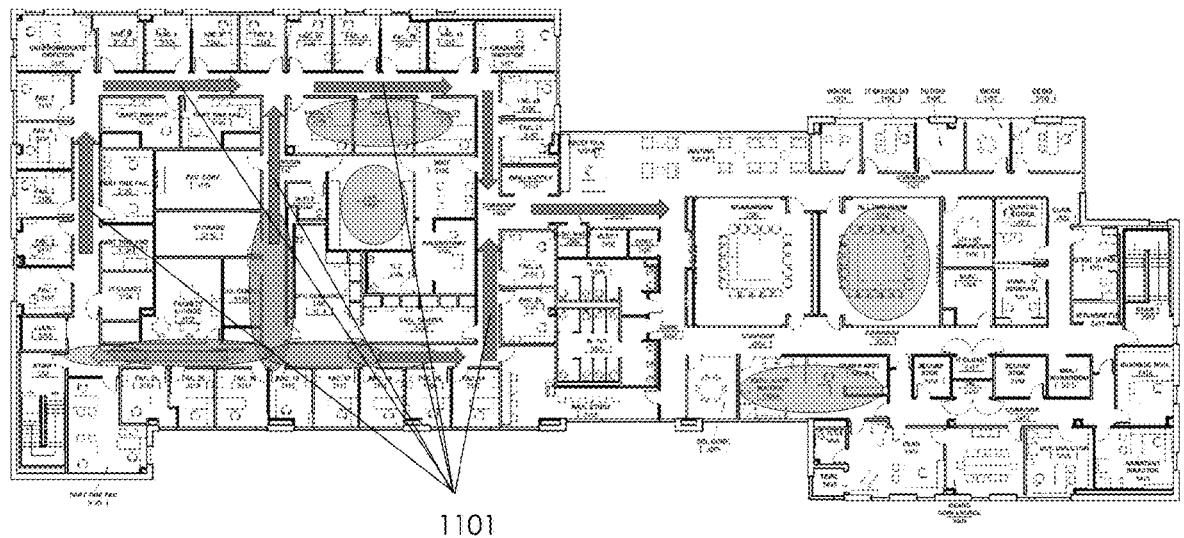
FIG. 11 illustrates an alternate evacuation plan that could be generated at either the local control unit or remote control station, directing evacuees away from the emergency areas toward an unobstructed emergency stairwell.

Pull stations 13 and SSUs 14 may contain motion sensors in addition to temperature, humidity, smoke, noise, or pressure sensors. Now referring to FIG. 9, motion detection data collected from these sensors can be integrated at the local control unit to permit computer 121 to generate a heat-mapped display of areas 91 on the floor plan where motion has been detected, and where the most detected motion has occurred, i.e. the most populated areas on the floor plan. FIG. 10 shows a conventional static building evacuation plan, with arrows 101 showing the evacuation route. The issue with this system is that arrows 102 direct evacuees through an active fire zone in order to reach the escape stairwells 61. However, in embodiments of the current system, software running on general purpose computer 121 at local control unit 12 or general purpose computer 201 at remote control station 20 analyze the data from pull stations 13 and SSUs 14 to locate the fire regions, and compute alternate evacuation routes (indicated by arrows 1101) to avoid affected areas, as illustrated in FIG. 11. Alternatively, the software running on general purpose computers 121, 201 or personal computing device 19 allow a fire marshal or AHJ to manually change evacuation routes using an input/output terminal 123, 203 located at either local control unit 12, remote control station 20, or personal computing device 19. The application software ensures that all sensor data received is transmitted to remote control stations 20/personal computing device 19 and displays this as it would be displayed on an output terminal at either local control unit 12 or remote control station 20. Thus, a fire marshal or AHJ can either remotely (i.e. from a remote control station 20 or personal computing device 19) or locally control building evacuation based on information received from pull stations 13 and SSUs 14 located within the building.

Figure 12:
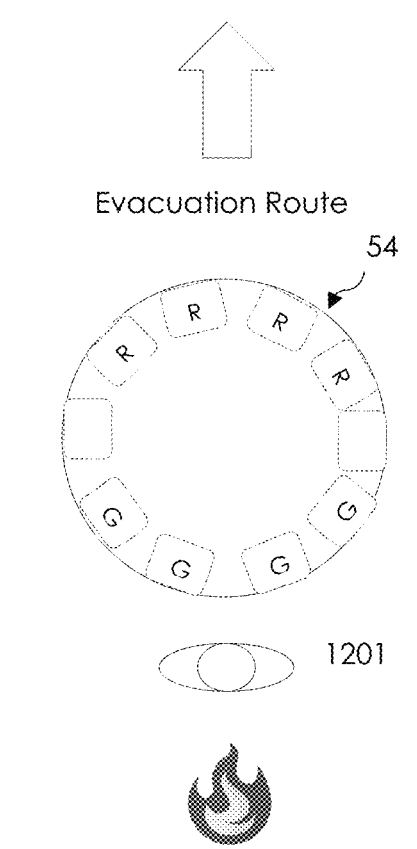
FIG. 12 shows one embodiment of sensor and signal units featuring LED lights and the pattern used to direct evacuees to a safe evacuation route along a straight corridor.
Figure 13:
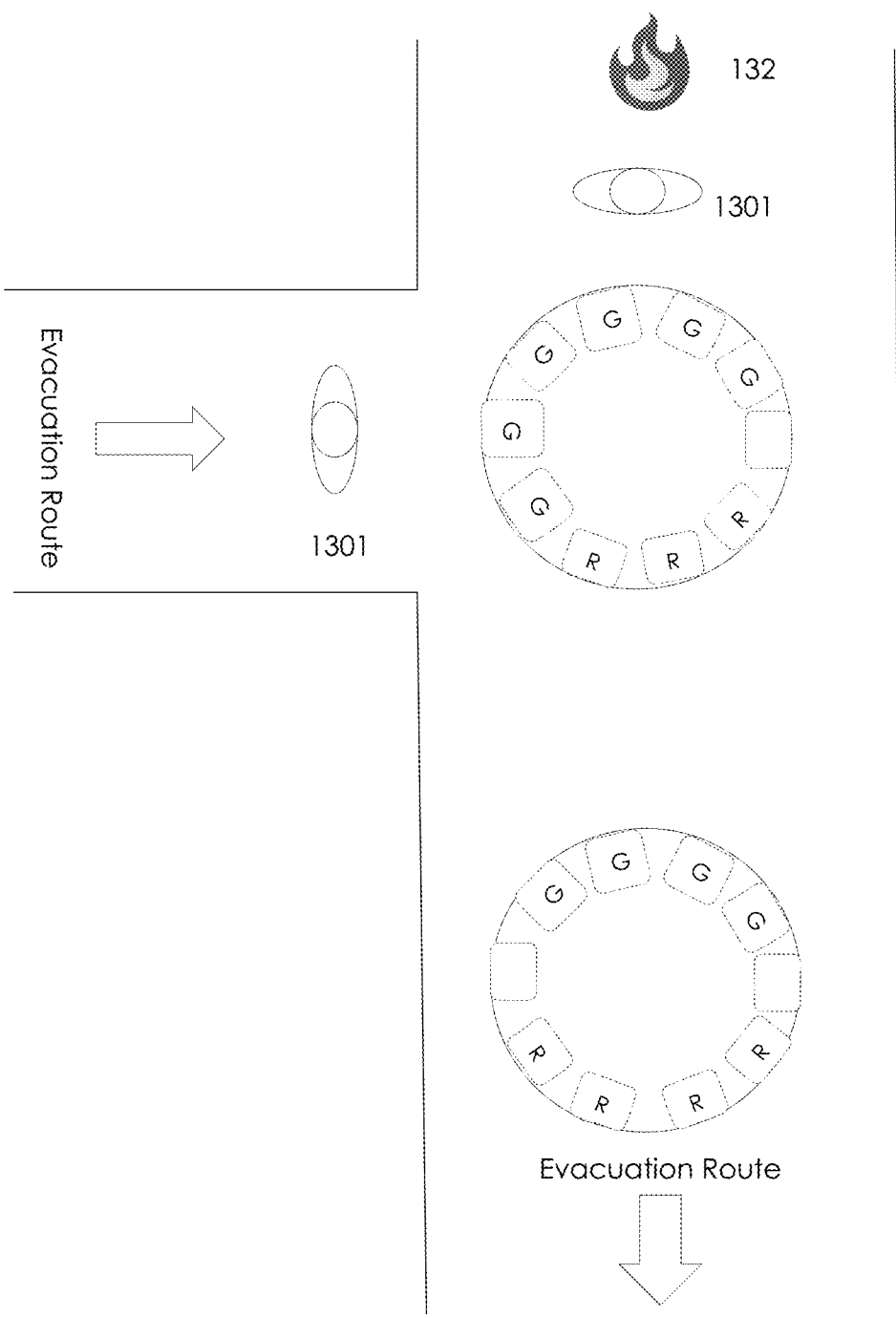
FIG. 13 shows one embodiment of sensor and signal units featuring LED lights and the pattern used to direct evacuees to a safe evacuation route at a corridor intersection.

Once the correct evacuation route has either been determined (either automatically or manually), this route must be communicated to evacuees in what is typically a stressful and chaotic situation. As described above and shown in FIGS. 3 and 5, SSUs 14 incorporate, in addition to a smoke detector 52, a plurality of high-intensity signal lights 53. In one preferred embodiment, signal lights 53 are multicolored LED lights capable of illuminating either red, green, blue, or amber. In this embodiment, signal lights are disposed around the perimeter of signal housing 54 as shown in FIG. 5. In this embodiment, signal housing is circular, so that the signal lights 53 are disposed on a 360 degree arc, i.e. visible from all directions. Different patterns of illumination are possible in response to signals sent in response to the customized evacuation plan generated at local control unit 12, personal computing device 19, or remote control station 20. For example, FIG. 12 is an overhead view of signal housing 54 for a fire evacuation scenario. From the perspective of evacuee 1201, the green signal lights marked "G" in FIG. 12 indicate the correct evacuation route, while red signal lights marked "R" indicate the wrong direction. FIG. 13 shows a placement of SSUs 14 at a corridor t-intersection, where the pattern of red and green signal lights on signal housing 54 direct evacuees 1301 away from the fire area 132. In the alternate embodiment shown in FIG. 5, the multifunction display 57 visible from the direction leading to the fire will display a message such as "WRONG WAY", "FIRE AHEAD", "TURN AROUND", etc. or a corresponding symbol, while the multifunction display 57 direction leading away from the fire may display a message such as "EXIT THIS WAY", "WAY OUT", etc. or a symbol (e.g. an arrow) corresponding to these messages.

SSU 14 can be used to communicate the nature of an emergency events (e.g. severe weather, fire, active shooter) in addition to the evacuation route using different signal light patterns. For example, a fire situation could be indicated by turning signal lights 53 on and off in a sequence that gives the impression of a rotating red beacon alternating with the solid red and green lights described above showing the evacuation route. An active shooter situation could be indicated by a rotating blue signal generated by signal lights 53, alternating with a red/green pattern indicating the evacuation route. The route to a severe weather shelter could be indicated, e.g. by a rotating amber beacon alternating with a red/green pattern indicating the route to a storm shelter.

In some embodiments pull stations 13 incorporate a multifunction display capable of displaying a QR code. An evacuee scanning the QR code using personal computing device 19 will be presented with a building floorplan showing the current evacuation route.

Although the present invention has been described in detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A building emergency evacuation system comprising:
   one or more legacy sensors each adapted to generate a first signal;
   one or more sensor and signal units, comprising:
      a ceiling-recessed smoke sensor cavity adapted to generate a second signal;
      a signal housing adapted to display evacuation information;
      connecting structure joining the smoke sensor cavity and the signal housing, the connecting structure comprising a plurality of vents adapted to permit smoke flow into the cavity; and
      a microcontroller adapted to (i) receive an evacuation signal comprising information associated with an evacuation plan, and (ii) cause said signal housing to display evacuation information based on the evacuation plan;
   one or more pull stations comprising one or more of a motion sensor, temperature sensor, humidity sensor, smoke sensor, noise sensor, or pressure sensor, the one or more pull stations adapted to generate a third signal; and
   a local control unit coupled to the legacy sensors, sensor and signal units and pull stations, and adapted to (i) detect either the first signal, second signal, or third signal, (ii) generate the evacuation signal; and
   a set of software instructions stored in a remote control station comprising a database, the set of software instructions adapted to interface with the local control unit and to permit real-time modification of the evacuation plan by an authority having jurisdiction.

2. The system of claim 1, wherein the local control unit is further adapted to autonomously generate the evacuation plan.

3. The system of claim 1, wherein the remote control station database is located in a personal computing device.

4. The system of claim 1, wherein the signal housing is omnidirectional.

5. The system of claim 4, wherein the signal housing comprises high intensity signal lights.

6. The system of claim 5, wherein the high intensity signal lights comprise multi-color LEDs.

7. The system of claim 1, wherein the signal housing comprises multifunction displays.

\* \* \* \* \*